March 24, 1959  R. J. BERNOTAS  2,878,882
LEG TYPE TRACTION MEANS
Filed Feb. 4, 1957  2 Sheets-Sheet 1

INVENTOR.
Ralph J. Bernotas
BY
R. P. Barnard
ATTORNEY

March 24, 1959 R. J. BERNOTAS 2,878,882
LEG TYPE TRACTION MEANS
Filed Feb. 4, 1957 2 Sheets-Sheet 2

INVENTOR.
Ralph J. Bernotas
BY
R. F. Barnard
ATTORNEY

United States Patent Office 2,878,882
Patented Mar. 24, 1959

2,878,882

LEG TYPE TRACTION MEANS

Ralph J. Bernotas, South Euclid, Ohio, assignor to General Motors Corporation, Detroit, Mich., a corporation of Delaware Application February 4, 1957, Serial No. 638,057

7 Claims. (Cl. 180—8)

The present invention relates to a fluid actuated tractive aid for a vehicle to increase the traction of the latter while travelling or initially starting on slippery surfaces such as ice and hard-packed snow.

It is common practice to utilize at certain installations such as airports a vehicle having a drawbar adapted for attachment to an aircraft or luggage carrying trailer for towing purposes. It will be readily appreciated that such a towing vehicle must have highly tractive engagement with the ground, particularly in starting, to tow such loads. The problem is further intensified when the towing vehicle is operating on slippery surfaces such as may be encountered when the supporting terrain is wet or covered with ice or snow. In such conditions, a crawler type tractor may be used as a towing vehicle to take advantage of the additional tractive effort afforded by the ground engaging grousers of the endless tracks which bite into the supporting terrain to supply a tractive effort according to the drawbar pull of the vehicle. However, it is not desirable to use such crawler tractors as a towing vehicle because of the limitations imposed by their relatively low speed compared to a conventional rubber-tired vehicle. Crawler tractors are only efficiently utilized for short hauling distances because of their low speed, whereas rubber-tired vehicles which are capable of greater speeds are desirable where the towed load is to be moved quickly over relatively large distances. Moreover, even where crawler tractors are employed as a towing vehicle, the amount of towing force that they can effectively apply is limited by their drawbar pull which, in turn, is affected by the weight of the tractor and the tractive engagement of its tracks with the terrain.

It is, therefore, the primary object of this invention to provide a fluid actuated tractive aid for such vehicles, and particularly rubber-tired towing vehicles, which serves to increase tractive effort. According to the teachings of this invention, a vehicle of the type described may be equipped with preferably two but possibly more fluid operated stepper assemblies having a ground engaging foot or cleat for stroking movement relative to the terrain to increase the tractive effort of the towing vehicle.

Within the scope of this invention, each stepper assembly may include a ground engaging foot which is operatively connected to the vehicle frame at spaced points thereon by fluid operated jacks, each stepper assembly being operable in timed relationship to the other so that one assembly is making a stroke to push the vehicle forwardly while the other stepper assembly is actuated to step the foot associated therewith forwardly to a position to make another stroke at the end of the stroke of the former assembly.

Another advantage of the present invention is the provision of stepper assemblies which are operated in timed relationship through the medium of a valve having a follow-up linkage operatively connected to one of the stepper assemblies, whereby the valve may be automatically rapidly shifted to alternate actuation of the respective stepper assemblies in accordance with the position of one stepper assembly.

Within the scope of this invention, a novel fluid system is employed in which actuation of one of the fluid jacks of one assembly causes reverse actuation of the corresponding jack of the other assembly so as to alternate actuation of the respective assemblies.

These and other features, objects and advantages of this invention will appear more fully hereinafter as the description proceeds, and in which reference is made to the following drawings in which.

Figure 1:
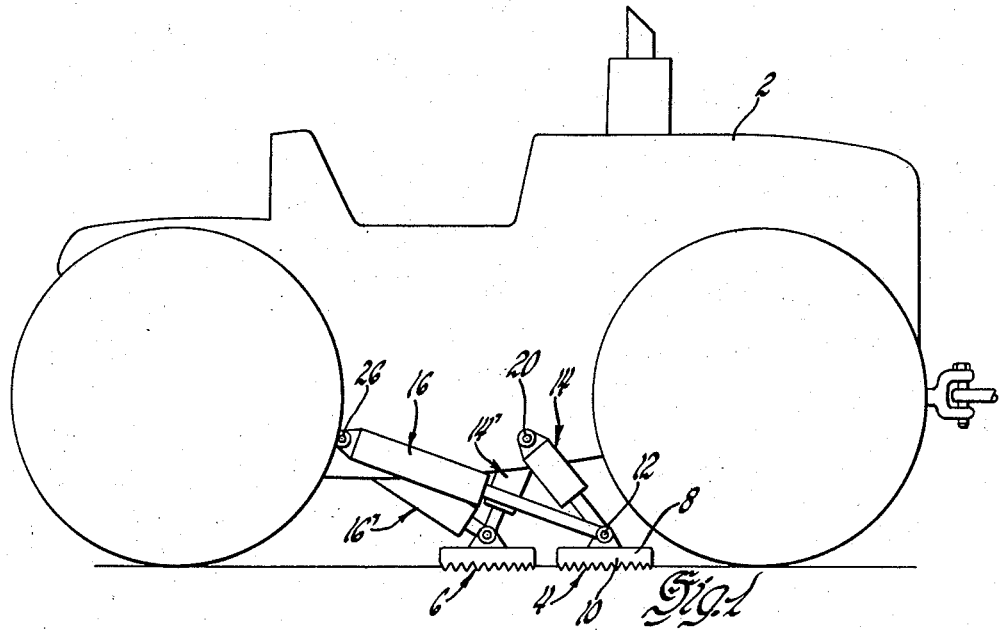
Figure 1 is a side view showing the relationship of the stepper assemblies relative to one type of tractor with which they may be used.

Referring now to the drawings, there is disclosed by way of example a rubber-tired tractor 2 having mounted thereon near its longitudinal center line two laterally spaced stepper assemblies 4 and 6. Insofar as the structure and arrangement of the fluid actuated jacks and the feet to which they are connected are concerned, each assembly is identical. Therefore, in describing these assemblies, reference will be made to the assembly 4 with corresponding parts in the other assembly 6 being indicated by a like numeral primed.

Referring now to the stepper assembly 4, it may be seen to include a foot 8 having ground engaging claws 10 on the bottom thereof, which foot is pivotally connected at 12 to an anchor jack 14 and stroke jack 16. The anchor jack includes a cylinder 18 pivotally connected at 20 to the vehicle frame and a piston 22 disposed therein for extension and retraction. As will appear more fully hereinafter, this piston and jack structure is operative to alternately anchor the foot to the ground and lift the foot from the ground. The stroke jack 16 comprises a cylinder 24 pivotally connected to the vehicle frame at a point 26 spaced longitudinally forwardly of the pivotal connection to the frame of the anchor jack 14. A piston 28 is slideably disposed for reciprocal movement within the stroke jack cylinder 24. Both jacks of each assembly are double acting.

Upon operation of the fluid control means to be described, the stepper assembly 4 may be operated to extend the anchor jack to firmly engage the foot with the terrain, the double acting stroke jack then being extended to thrust the vehicle forwardly along the terrain from the foot. At the end of the stroke cycle of the assembly 4, the hydraulic system will cause a new cycle to begin in which the anchor jack is retracted to lift the foot from the terrain and the stroke jack is retracted to swing the foot forwardly longitudinally about the pivotal connection 20 of the anchor jack cylinder to the frame to a position to begin a new stroke cycle. As will appear more fully hereinafter with a description of the hydraulic control means, the stepper assemblies 4 and 6 are designed for alternate actuation; that is, while one stepper assembly such as 4 is performing a stroke cycle, the other stepper assembly 6 will be swinging forwardly or opposite to the assembly 4 to reach a position where it may begin a stroke cycle at the completion of the stroke cycle of assembly 4.

Referring now to the fluid system for controlling the alternate cycles of the respective stepper assemblies, it may be seen to include a fluid reservoir 30 connected by a conduit 32 to the inlet of pump 34 which supplies fluid under pressure through a conduit 36 to the inlet of selector valve 38. An exhaust conduit 40 connects an associated port in the selector valve to the reservoir 30.

The hydraulic system leading from the selector valve to the respective stepper assemblies is actually two distinct systems, each of which conducts fluid in two directions. However, these two systems are interconnected by suitable conduits to achieve the desired alternate cycles of the respective assemblies. Thus, again referring to assembly 4 with prime numerals indicating the corresponding part of the system associated with assembly 6, the system associated directly with assembly 4 may be seen to include a conduit 42 having conduits 44 and 46 branching therefrom to communicate with, respectively, one end of the stroke jack of assembly 4 and one end of the anchor jack of assembly 6. The corresponding ends of the two stroke jacks opposite their connections to the conduits 44 and 44' are connected by the conduit 48. Furthermore, a source of constant pressure such as a conventional accumulator 50 may be connected to a conduit 52 which interconnects corresponding ends of the two anchor jacks opposite the connection therewith of the conduits 46 and 46'. It will, of course, be understood that the term "opposite" is meant to indicate that the fluid conduits are connected to each jack cylinder on opposite sides of the piston disposed therein. It will also be appreciated that the constant urging pressure of the accumulator acting on the anchor jack pistons to extend them could be replaced by other means such as a pre-loaded spring carried above the pistons in the respective anchor jack cylinders. Depending on the setting of the selector valve, fluid may flow therefrom through conduit 42 to accomplish a stroke cycle in assembly 4 while fluid is exhausted from conduit 42' to the reservoir as the assembly 6 steps forwardly to position itself for a stroke cycle. When the valve is moved to another position, the flow of fluid is reversed thereby reversing the operation of the respective assemblies.

Figure 2:
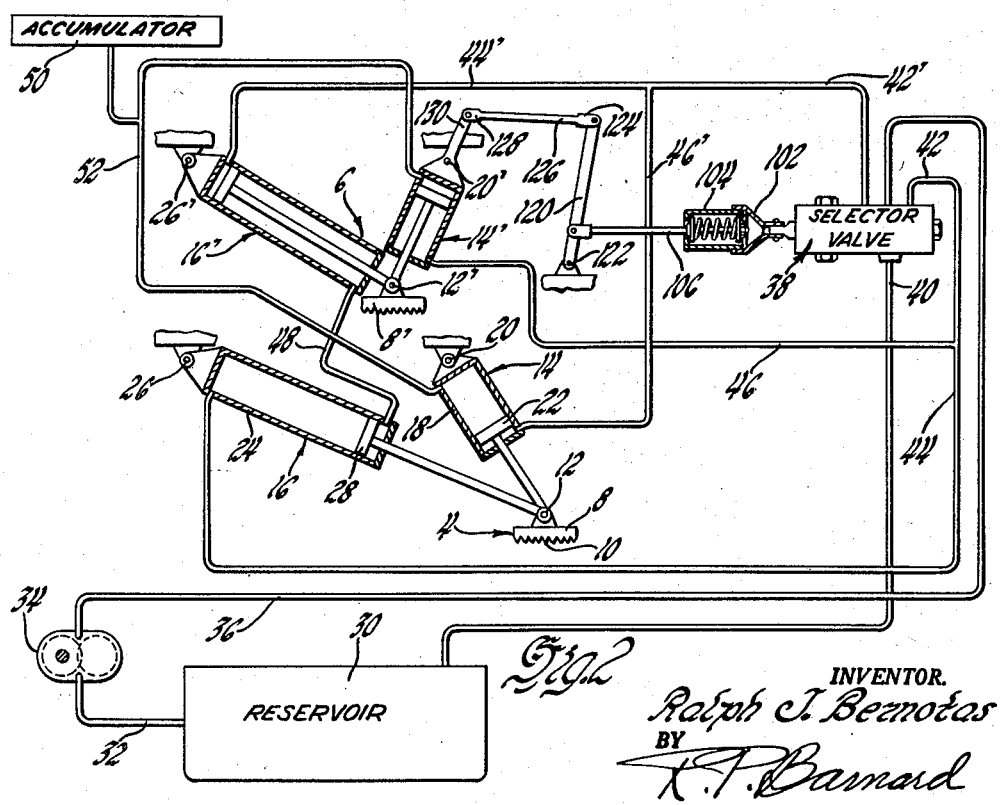
Figure 2 is a schematic view of the fluid system employed to actuate the stepper assemblies.

In Figures 1 and 2, the assemblies are shown at or near the end of the propelling or stroke cycle of assembly 4, the assembly 6 having swung the foot associated therewith forwardly toward a position from which it may accomplish a stroke cycle. In order to obtain this position, the selector valve 38 was shifted to one position thereby passing fluid through conduits 42, 44 and 46 to extend stroke jack 16 while retracting anchor jack 14' of the other assembly 6. As the assemblies are so operated, fluid will be exhausted from the stroke jack 16 of assembly 4 through conduit 48 to the stroke jack 16' of assembly 6 to retract this jack thereby swinging the foot associated therewith about the pivotal connection 20' of the anchor jack 14' to the vehicle frame, thereby placing the assembly 6 in position for a stroke cycle. Fluid exhausted from the stroke jack 16' due to the retraction of the piston therein travels to the reservoir through conduits 44', 42' and 40. Fluid is exhausted from the anchor jack 14' of the assembly 6 into the conduit 52 of the constant pressure accumulator system. Upon completion of the stroke cycle of assembly 4, the selector valve will be rapidly shifted to its second position to reverse the flow of fluid throughout the entire system, the operation or cycle of the assemblies thereby being reversed.

Referring now to the selector valve and the means by which it is operated, it may be seen that the valve comprises a body 54 having a bore therethrough in which there are axially spaced annular lands 56, 58, 60, 62 and 64 forming therebetween with the valve body a plurality of axially spaced annular chambers 66, 68, 70, 72 and 74. An inlet port 76 is connected to the conduit 36 to receive fluid under pressure and supply it to the chamber 70 formed substantially centrally of the valve body bore from which the fluid may flow selectively to either chamber 68 or 72 depending upon the position of a valve spool. Ports 78 and 80 are, respectively, in communication with the branch conduits 42 and 42' and the chambers 68 and 72 axially spaced to either side of the inlet chamber 70. The end chambers 66 and 74 are exhaust chambers and may be selectively placed in communication with, respectively, the chambers 68 and 72 to exhaust fluid through the common passage 82 and port 84 to the conduit 40 leading to the fluid reservoir.

A valve spool 86 having axially spaced lands 88, 90 and 92 for cooperation with the various lands formed within the valve body bore in the usual manner is axially slideably disposed within the latter. At one end thereof, the valve spool is provided with two axially spaced radially inwardly deformed annular detent grooves 94 which are selectively engageable by a plurality of balls 96 held thereagainst by the pressure of the springs 98. A suitable seal 100 may be seated in an annular groove in the valve body surrounding the end of the valve spool to prevent leakage from the valve body. Suitable plugs permit access to the detent mechanism and valve body interior.

Figure 3:
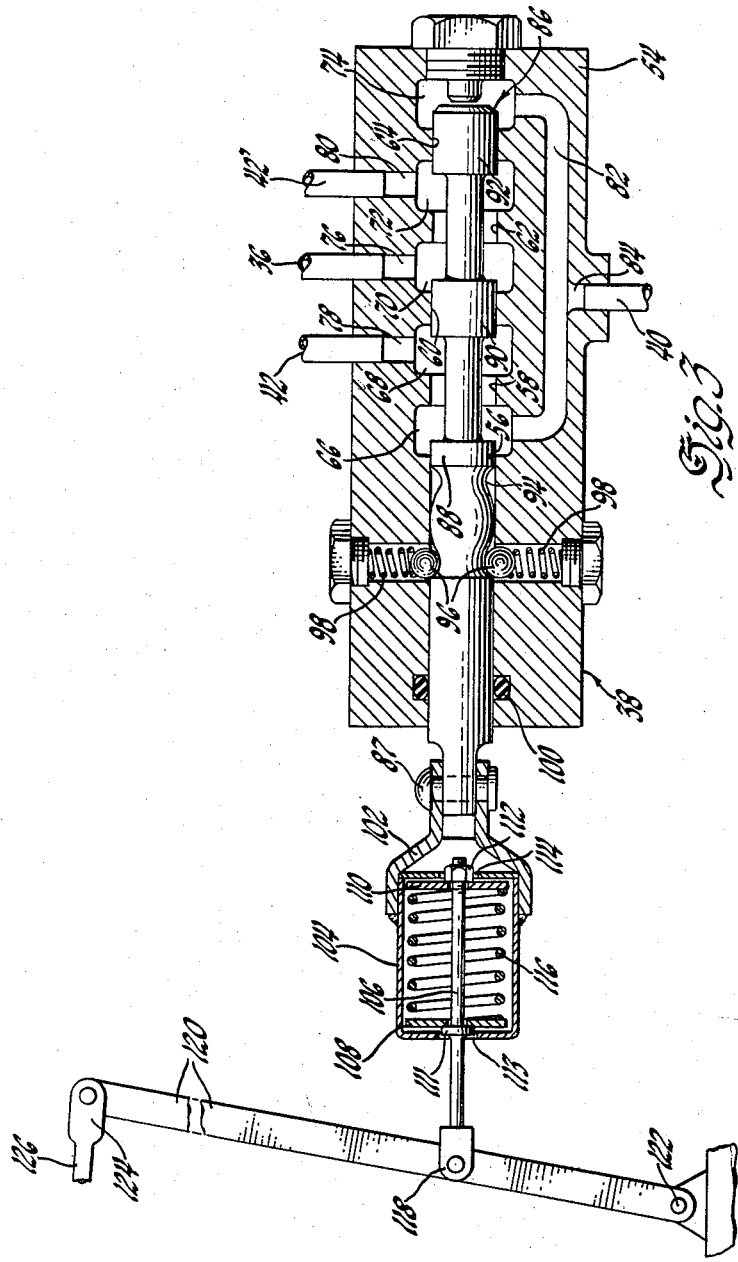
Figure 3 is an enlarged cross sectional view of the valve used to control the fluid system of Figure 2, including a portion of the valve actuating mechanism of Figure 2.

The end of the valve spool 86 may be pivotally or otherwise suitably secured at 87 to a yoke member 102 which is welded or otherwise secured to a cylinder 104 in which there is disposed a moveable valve operating rod 106 having mounted thereon annular plates 108 and 110 each having a bore therethrough surrounding and radially spaced from the rod 106 so as to be able to move axially relative to the rod in one direction. In Figure 3, the rod 106 may move to the left so that nut 112 will move through aperture 114 in the cylinder to move plate 110. Conversely, the rod may be moved in the opposite direction so that shoulder 111 thereon moves through aperture 113 to move plate 108. A coiled spring 116 is trapped within the cylinder between the annular plates 108 and 110. Thus, in the position shown in Figure 3, the operating rod may be moved to the left, the plate 110 thereby compressing the trapped spring in the cylinder. During this movement of the valve rod, the plate 108 will remain in the left end of the cylinder as the rod moves relative to it. At a predetermined point of movement of the valve rod relative to the cylinder to collapse the spring therein, the built-up spring pressure will cause the valve spool to rapidly shift to the left to a new setting as defined by the detent mechanism, at which time the spring and cylinder will again assume a position as shown in Figure 3. Thereafter, if the valve is to be shifted in the opposite direction the operating rod may be moved to the right thereby causing the shoulder 111 to pick up the plate 108 to again compress the spring. After this spring is loaded to a predetermined extent, the valve spool will be rapidly shifted back to the position shown in Figure 3.

One end of the valve operating rod is pivotally connected by a pin and clevice arrangement 118 intermediate the ends of a lever 120 having one end pivotally connected at 122 to the vehicle frame while the other end is pivotally connected by a pin and clevice arrangement 124 to a control link 126 which in turn is pivotally connected by a similar clevice arrangement 128 to a rod or lever 130 preferably formed integral with or otherwise secured to the anchor jack cylinder of one of the stepper assemblies, herein shown as assembly 6, so as to be pivoted with the anchor jack as the foot connected thereto moves relative to the vehicle frame. Thus, the aforedescribed levers and linkages form a follow-up mechanism for selectively rapidly shifting the valve in accordance with the position of one of the stepper assemblies in a cycle. Since the respective selector assemblies are at any one time performing an opposite cycle, the follow-up linkage could be connected to either jack of either assembly for its only function is to operate the selector valve rapidly at the end of the respective cycles of the two stepper assemblies to reverse them. It is preferred and believed more convenient, however, to connect the follow-up assembly to one of the anchor jack cylinders as shown because movement of the latter is directly related to corresponding movement of its associated foot.

Aforedescribed, Figures 1 and 2 show the stepper assemblies at or near the end of the stroke cycle of assembly 4. At this time, the valve spool 86 will be shifted to the left in Figure 3, but will be about to shift into the position shown in that figure due to clockwise pivoting of the lever 120 as anchor jack 14' swings clockwise. As assembly 4 has been stroking, assembly 6 has been stepping forwardly thereby pivoting lever 120 clockwise to load spring 116 to ultimately shift the valve spool 86 into the position shown in Figure 3 which will direct fluid to cause stroking in assembly 6 and stepping in assembly 4. Thus, the Figure 3 position of the valve spool 86 corresponds to that portion of the cycles just following the cycle portion described relative to Figures 1 and 2. Therefore, the assembly 6 is now actuated to stroke while assembly 4 is stepping. During this sequence, lever 120 will be pulled counterclockwise to ultimately shift valve spool 86 to the left in Figure 3.

I claim:

1. A tractive aid for a vehicle comprising, a ground engaging foot, a fluid operated anchor jack pivotally connecting said foot to said vehicle and operable to engage said foot with the ground and to terminate such engagement, a fluid operated stroke jack pivotally connecting said foot to said vehicle and operable in one direction to thrust said vehicle forwardly from said foot while the latter is engaged with said ground, said jack being operable in the reverse direction to swing said foot longitudinally forwardly of the vehicle about the pivotal connection thereto of the anchor jack at the end of a stroke cycle, a source of fluid under pressure, and valve means including a follow-up linkage operatively connected to said anchor jack to reverse the flow of fluid and operation of said jacks at the end of the movement of said stroke jack in either direction.

2. A tractive aid for a vehicle comprising, two fluid operated stepper assemblies carried by said vehicle to alternately engage terrain traversed by said vehicle to aid in propelling the latter, each said assembly comprising, a terrain engaging fore and aft swingable foot, a fluid operated anchor jack pivotally connected to said foot and to said vehicle for swinging movement of said foot longitudinally of the vehicle, said anchor jack being extensible to engage said foot with the terrain and retractable to terminate said engagement, a fluid operated stroke jack pivotally connecting said foot to said vehicle at a point spaced from the connection therewith of said anchor jack, said stroke jack being operable in one direction to propel said vehicle across the terrain and operable in the opposite direction to swing said foot longitudinally of said vehicle about the pivotal connection thereto of said anchor jack, a fluid system including a source of fluid under pressure, valve means in said system operable to control supply and exhaust of fluid to the jacks of said assemblies for alternate propelling actuation thereof, said valve means being operatively connected to one of said assemblies to respond to the movement of the latter to alternate operation of said assemblies.

3. A tractive aid for a vehicle comprising, two fluid operated stepper assemblies carried by said vehicle to alternately engage terrain traversed by said vehicle to aid in propelling the latter, each said assembly comprising a terrain engaging fore and aft swingable foot, a fluid operated anchor jack pivotally connecting said foot to said vehicle for swinging movement of said foot longitudinally of the vehicle, said anchor jack being extensible to engage said foot with the terrain and retractable to terminate said engagement, a fluid operated stroke jack pivotally connecting said foot to said vehicle at a point longitudinally spaced from the connection therewith of said anchor jack, said stroke jack being extensible to propel said vehicle across the terrain and retractable to swing said foot longitudinally of said vehicle about the pivotal connection thereto of said anchor jack, a fluid system including a source of fluid under pressure, valve means in said system operable to alternately supply and exhaust fluid to the jacks of said assemblies for alternate propelling actuation thereof, said valve means including a follow-up linkage operatively connected to the anchor jack of one of said assemblies to respond to the movement of the latter to reverse operation of said assemblies.

4. A tractive aid for a vehicle comprising, two fluid actuated stepper assemblies pivotally supported on said vehicle to alternately engage terrain traversed by said vehicle to aid in propelling the latter, each said assembly comprising a fluid operated anchor jack pivotally connected to said vehicle, a fluid operated stroke jack pivotally connected to said vehicle at a point spaced from the connection therewith of said anchor jack, the other ends of said jacks being pivotally connected to a ground engaging foot, the stroke jack of one assembly being operated under pressure to propel said vehicle along the ground while the stroke jack of the other assembly is operated in an opposite direction to lift said foot and swing it forwardly longitudinally of the vehicle about the pivotal connection of its associated anchor jack with said vehicle, a source of fluid under pressure, valve means controlling the alternate propelling actuation of said assemblies, said valve means being operatively connected to one of said assemblies.

5. A tractive aid for a vehicle comprising, two fluid actuated stepper assemblies pivotally supported on said vehicle to alternately engage terrain traversed by said vehicle to aid in propelling the latter, each said assembly comprising a fluid operated anchor jack pivotally connected to said vehicle, a fluid operated stroke jack pivotally connected to said vehicle at a point spaced from the connection therewith of said anchor jack, the other ends of said jacks being pivotally connected to a ground engaging foot, the stroke jack of one assembly being extended under pressure to propel said vehicle along the ground while the stroke jack of the other assembly is retracted to lift said foot and swing it forwardly longitudinally of the vehicle about the pivotal connection of its associated anchor jack with said vehicle, a source of fluid under pressure, valve means controlling the alternate propelling actuation of said assemblies, said valve means being operatively connected by a follow-up linkage to the anchor jack of one of said assemblies above the pivotal connection of said jack to said vehicle.

6. A tractive aid for a vehicle comprising, two fluid-operated stepper assemblies carried by said vehicle to alternately engage terrain traversed by said vehicle to aid in propelling the latter, each said assembly comprising, a terrain engaging fore and aft swingable foot, a fluid operated anchor jack pivotally connecting said foot to said vehicle for swinging movement of said foot longitudinally of said vehicle, said anchor jack including a cylinder having a piston slideably disposed therein and operable in one direction to engage said foot with the terrain during the stroke cycle of said assembly and operable in the opposite direction to terminate said engagement during a stepper cycle of said assembly, a fluid operated stroke jack pivotally connecting said foot to said vehicle at a point spaced longitudinally from the connection therewith of said anchor jack, said stroke jack including a cylinder having a piston slideably disposed therein and operable in one direction during a stroke cycle to propel said vehicle across the terrain and operable in the opposite direction during a stepper cycle to swing said foot longitudinally of said vehicle about the pivotal connection thereto of said anchor jack, a source of fluid under pressure, parallel fluid circuit means establishing fluid communication between said source and one side of each stroke jack piston and one side of the anchor jack piston of the other assembly, conduit means establishing fluid communication between the other sides of said stroke jack pistons, whereby flow of fluid through said parallel circuit means operates the stroke jack of one assembly in one direction and operates the anchor jack of the other assembly in the opposite direction, the exhaust from the stroke jack of said one assembly flowing through said conduit means to operate the stroke jack of the other assembly thereby swinging the foot of said assembly longitudinally of the vehicle, a selector valve in said fluid circuit means selectively operable in one position to operate one assembly in a stroke cycle and the other assembly in a stepper cycle, and means operatively connecting said valve to one of said assemblies for shifting said valve to another position to reverse the cycles of said assemblies.

7. A tractive aid for a vehicle comprising, two fluid operated stepper assemblies carried by said vehicle to alternately engage terrain traversed by said vehicle to aid in propelling the latter, each said assembly comprising, a terrain engaging fore and aft swingable foot, a fluid operated anchor jack pivotally connecting said foot to said vehicle for swinging movement of said foot longitudinally of said vehicle, said anchor jack including a cylinder having a piston slideably disposed therein and being extensible to engage said foot with the terrain during the stroke cycle of said assembly and retractable to terminate said engagement during a stepper cycle of said assembly, a fluid operated stroke jack pivotally connecting said foot to said vehicle at a point spaced longitudinally from the connection therewith of said anchor jack, said stroke jack including a cylinder having a piston slideably disposed therein for extension of said jack during a stroke cycle to propel said vehicle across the terrain and for retraction of said jack during a stepper cycle to swing said foot longitudinally of said vehicle about the pivotal connection thereto of said anchor jack, a source of fluid under pressure, parallel fluid circuit means establishing fluid communication between said source and one side of each stroke jack piston and one side of the anchor jack piston of the other assembly, conduit means establishing fluid communication between the other sides of said stroke jack pistons, means for applying constant pressure on the other sides of said anchor jack pistons to continuously urge said anchor jacks to an extended position, whereby flow of fluid through said circuit means extends the stroke jack of one assembly and retracts the anchor jack of the other assembly against said constant pressure, the exhaust from the stroke jack of said one assembly flowing through said conduit means to retract the stroke jack of the other assembly thereby swinging the foot of said other assembly longitudinally of the vehicle, a selector valve in said fluid circuit means selectiveyl operable in one position to operate one assembly in a stroke cycle and the other assembly in a stepper cycle, and follow-up linkage means operatively connecting one of said assemblies to said valve whereby the latter is rapidly shifted to another position for reversing the cycles of said assemblies at the end of either cycle of said one assembly.

References Cited in the file of this patent
UNITED STATES PATENTS

| | | |
|---|---|---|
| 128,543 | Herrmann | July 2, 1872 |
| 278,822 | Richardson | June 5, 1883 |
| 1,298,703 | Havens | Apr. 1, 1919 |
| 2,452,632 | Cameron | Nov. 2, 1948 |